United States Patent [19]

Fukuda

[11] 3,839,900

[45] Oct. 8, 1974

[54] AIR LEAKAGE DETECTOR

[76] Inventor: Akira Fukuda, 2-22-8, Kasuga-cho, Tokyo, Japan

[22] Filed: June 8, 1972

[21] Appl. No.: 260,742

[30] Foreign Application Priority Data
Feb. 24, 1972 Japan.............................. 47-19122

[52] U.S. Cl. .............................................. 73/49.3
[51] Int. Cl. ......................................... G01m 3/26
[58] Field of Search ......... 73/40, 41, 45, 45.1, 45.2, 73/45.9, 49.2, 49.3, 52, 149

[56] References Cited
UNITED STATES PATENTS
3,028,750   4/1952   Rondeau................................. 73/40
3,355,932   12/1967  Mulligan............................. 73/49.3

*Primary Examiner*—S. Clement Swisher

[57] ABSTRACT

A pneumatic circuit for testing articles for leaks which includes means for measuring the size of the article and testing the circuit for operability. A conventional bridge circuit is provided with means for varying the effective volume of one side of a bridge circuit for accomplishing these ends.

2 Claims, 3 Drawing Figures

PATENTED OCT 8 1974　　　　　　　　　　　3,839,900

AIR LEAKAGE DETECTOR

CROSS-REFERENCE TO RELATED APPLICATIONS

This application is related to may copending application Ser. Nos. 250,742, 250,751 and 250,752 all filed on May 5, 1972.

SUMMARY OF THE INVENTION

With the classical type of air leakage detector, it was not possible to measure the interior volume of the object being tested; nor was it possible to detect the amount of leakage, nor verify whether the measuring apparatus was consistently functioning as it should. It was not possible to determine, when the device was being used for mass production, for example, if the measuring apparatus had broken down. Defective objects could thus escape detection, a characteristic which made the system somewhat unworthy of confidence.

The present invention constitutes an improvement of the device, and is intended to eliminate all of these defects by adding a very simple circuit and joining apparatus.

DETAILED DESCRIPTION OF THE INVENTION

Figure 1:
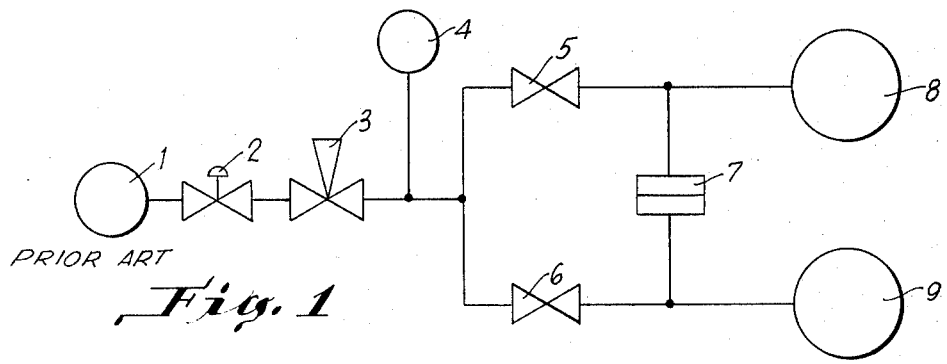
FIG. 1 is a schematic diagram of a leak detecting circuit representative of the prior art.

The present invention may be explained by an example of application as illustrated in the drawings.

FIG. 1: 1 is a compressed air source; 2 is a decompression valve; 3 is a three- directional electromagnetic valve; 4 is a manometer; 5 and 6 are valves; 7 is a pressure differential detector; 8 and 9 are chambers for containing test and comparison objects.

Figure 2:
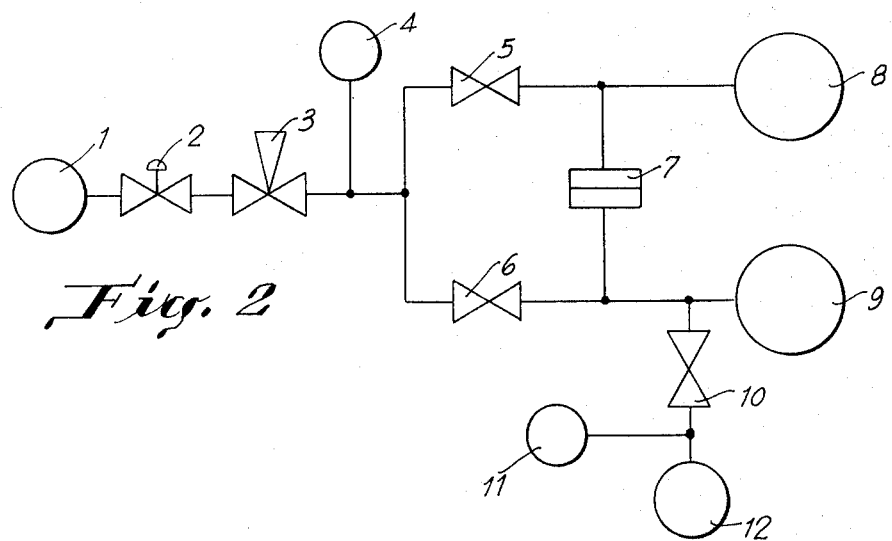
FIG. 2 is a schematic diagram of one embodiment of the invention.

FIG. 2: 1 is a compressed air source; 2 is a decompression valve; 3 is a three-directional electromagnetic valve; 4 and 11 are manometers; 5, 6, and 10 are valves; 7 is a pressure differential detector; 8 and 9 chambers for containing test and comparison objects; 12 Reservoir.

Figure 3:
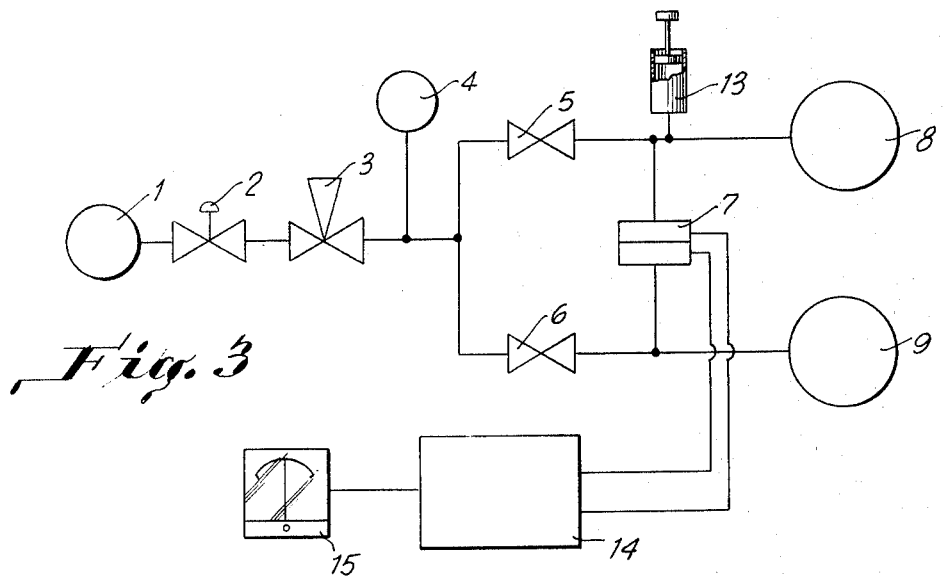
FIG. 3 is a schematic diagram of another embodiment of the invention.

FIG. 3: 1 is a compressed air source; 2 is a decompressopn valve; 3 is a three- directional electromagnetic valve; 4 and 11 are manometers; 5 and 6 is a valves; 7 is a pressure differential detector; 8 and 9 are chambers for containing test and comparison objects; 13 is a reservoir equipped with a high precision regulation device (including a pump); 14 is an amplifier; 15 is a meter.

In the operation of the detection system represented by FIG. 1, the pressure of the air emanating from the compressed air source 1 is regulated with the aid of the decompression valve 2, the pressure being indicated on the manometer 4. The air then passes through valves 3, 5 and 6 which are closed after an equilibrium has been reached. Possible leakage in the objects 8 and 9 may be noted with the aid of the pressure differential detector 7. The signal may be amplified by an amplifier 14 and may be measured by a reading of the meter 15, as shown in FIG. 2. With the pointer set in advance at the zero position, a deviation to the right or the left indicates that a leak has occurred in either of the objects 8 or 9. The lack of any significant movement of the poiter relative to the center position means that there has been no leak in the test objects 8 and 9. In the event that an accident causes the measuring device to break down while it is being used, i.e., the meter needle remaining motionless, there is the possibility that defective objects avoid detection. This defect constitutes a major shortcoming when the apparatus is to be used for quality testing of factory products. The present invention is designed to make basic improvements which will eliminate this defect.

Turning to FIG. 2, we see a traditional type circuit to which has been added another circuit including a valve 10, a manometer 11, and a reservoir 12. The interior volume of this reservoir corresponds to volume of leakage allowable for assuring the quality of the test objects 8 and 9.

In carrying out the measurement, the valve 10 is opened. This has the effect of producing a pressure differential. The pointer of the meter 15 is then set to correspond to this pressure differential. It is as of this moment that the operation of measuring, properly speaking, commences. If the test object is sound, the pointer needle will return to the zero position. If the apparatus is borken down, the needle will not move when the pressure differential is produced. It is thus possible to detect a breakdown in the measuring system.

In the case of a measuring operation carried out under pressure, the above procedure is departed from by allowing air to escape into the reservoir 12. In measuring under vacuum conditions, the pressure differential may be produced by introducing a fixed volume into the reservoir 12.

In the following, we present an example calculation of the interior volume.

V1 : Interior volume of the test objects. (cc)
V2 : Interior volume of the reservoir.
P1 : First pressure applied to the test piece (Kg/cm² G)
P2 : Pressure after opening (Kg/cm² G)

$$V1 (P1 + 1.03) + V2 \times 1.03 = (V1 + V2)(P2 + 1.03).$$
$$V1\,P1 = V1\,P1 + V2\,P2$$

hence, $$V1 = V2\,P2/P1 - P2$$

This method is applied in the same way if the reservoir 13 with the high precision regulation device (see FIG. 3) is used. In this case, the reservoir 13 plays the role of reservoir 12.

By using reservoir 13 equipped with the high precision regulation device of FIG. 3, it is possible to determine the amount of leakage in accordance with the following calculation.

$V$: Interior volume of the test objects 8 and 9. (cc)
$\Delta V$: Variation of the interior volume produced by the pressure differential $P$ and detected by the detector 7. (cc)
$P$: Pressure at which the test is carried out.
$V_o$: Variation of volume in the reservoir 13 accompanied by the volume regulation device.
$P1$: Pressure after variation of the side of the object 8 (mm water)
$P2$: Pressure after variation of the side of the object 9 (mm water)

Side 8 : $PV = P1\,(V + V_o - \Delta V)$
Side 9: $PV = P2\,(V + \Delta V)$

Hence,
$$P1(V+V_0-\Delta V) = P2(V+\Delta V)$$
$$P1V + P1V_0 - P1\Delta V = P2V + P2\Delta V$$
$$P1V_0 = P2V - P1V + P2\Delta V + P1\Delta V$$
$$= V(P2-P1) + \Delta V(P2+P1)$$

Moreover:

$P2 - P1 = \Delta P$ and $P2 + P1 = 2P$

Thus $P1V_0 = \Delta PV + 2p\Delta V = \Delta P(V + 2(\Delta V/\Delta P)P)$
$V_0 = \Delta P/P1 (V + 2(\Delta V/\Delta P)P)$
$P \approx P1 = (1.03 + P) \times 10^4$ (mm Aq)
$V_0 = [\Delta P/(1.03+P) \times 10^4][V + 2\Delta V/\Delta P(1.03+P) \times 10^4]$ The formula for the pressure differential detector is the following:

$\Delta V/\Delta P = 2 \times 10^{-4}$ ( cc/mm Aq )
$V_0 [\Delta P/(1.03+P) 10^4][V + 4(1.03+P)]$
$(1.03 + P)V_0 = \Delta P/10^4 [V + 4(1.03+P)]$ The amount of leakage VL towards the atmospheric medium is represented by the following formula: $1.03 VL = \Delta P/10^4 [V + 4(1.03+P)]$ Thus, if $V_0$ is multiplied by $(1.03+P)/1.03$, it is possible to obtain the volume of the leakage toward the atmosphere. By varying the volume of the reservoir 13, equipped with the high precision regulation device, the pressure differential can be read, allowing us to know the interior volume of the test object 8.

If, by some means, the precision adjustment valve of the reservoir 13 is moved before each measurement, a movement of the meter 12 needle is visible. Measurement may then be undertaken after confirming that the pressure differential detector 7 is in good working order. The other components, including the electrical circuit should be checked to ascertain that they are in good condition. In this way, it becomes impossible to have defective objects pass for good ones.

I claim:

1. A method for measuring the volume of an article which comprise providing an apparatus having two chambers each of known volume, placing an article whose volume is to be determined in one chamber, introducing an air into both chambers at the same pressure, isolating the two chambers, changing the effective volume of one of the chambers, and measuring the pressure differential between the two chambers so that the volume of the article may be calculated.

2. A method for checking a leakage detector having a pair of chambers having known capacity, one of which is adapted to contain an article to be tested and a pressure differential indicating means connected between the two chambers comprising; introducing an air pressure into both chambers so that the pressures in both chambers is equal, isolating the chambers from each other, changing the effective volume of one of the chambers, measuring the differential pressure indicated by the pressure indicating means to determine the operability of the apparatus.

* * * * *